United States Patent Office

2,976,274
Patented Mar. 21, 1961

2,976,274

METHOD OF PRODUCING A HIGH VISCOSITY WATER-SOLUBLE GUM PRODUCT

William H. McNeely and Orville G. Lowe, San Diego, Calif., assignors to Kelco Company, San Diego, Calif., a corporation of Delaware No Drawing. Filed Feb. 21, 1958, Ser. No. 716,526

9 Claims. (Cl. 260—209)

This invention relates to a method of preparation of a high viscosity dextran, high viscosity corn fiber gum, high viscosity gum arabic, and the products obtained from said method. It is generally known that epichlorohydrin and other bi-functional etherifying agents, such as bis-(2-chloroethyl)ether react with polysaccharides, such as starch and cellulose, under alkaline conditions to effect cross-linking. Such cross-linking may lead to an increase in solution viscosity of the solubilized product.

The cross-linking reactions may be accomplished, for example, in solution, slurry, or in a dry state. We have carried out an extensive investigation of the cross-linking of gum arabic with epichlorohydrin and other bi-functional etherifying agents. Our processes were accomplished in alkaline aqueous colloidal solutions. Upon the completion of the cross-linking reactions, we neutralized the solutions with hydrochloric acid, sulfuric or acetic acids. After neutralization, we precipitated the gum arabic product of improved viscosity by mixing the solution with a water-miscible organic solvent, such as methanol, ethanol, isopropanol or acetone.

Untreated gum arabic, dextran and corn fiber gum, a hemicellulose gum extracted from corn hulls, are relatively low viscosity water soluble gums from which solutions containing relatively high solids can be prepared. When we attempted the preparation of a high viscosity gum arabic, dextran or corn fiber gum by the above method, it was found that one of the undesirable features was that the viscosity of the reaction mixtures rose to such a high level that satisfactory mechanical manipulation of the gum product became impossible. Because of this, it was very difficult to neutralize the reaction mixtures; thus satisfactory precipitation of the products became difficult or impossible to obtain.

We have now discovered a surprising new method of overcoming the aforesaid difficulties. At the same time, using our new method, great economies result in the use of reagents, and even more important, a better product is obtained by the new and improved procedure.

In our new method we react certain bi-functional etherifying agents with gum arabic, dextran or corn fiber gum and stop the reaction before a high viscosity is obtained. The reaction is allowed to continue until a desired degree of substitution occurs. The progress of the reaction may be followed by either determining the amount of salt produced or by the amount of sodium hydroxide or other base consumed. One mole of base is consumed for each mole of epihalohydrin that reacts. We have found that this initial reaction in solution should be allowed to continue until the alkali consumption, after correcting for any free acidity of the gum arabic, dextran or corn fiber gum corresponds to the reaction of 35% to 85% of the epihalohydrin added. The reaction is stopped at this point before any substantial increase in viscosity has taken place by neutralizing the excess base with an acid or precipitating the resulting gum arabic, dextran or corn fiber gum product by admixture with a water-miscible organic solvent. If desired, any remaining excess salts or caustic may be removed by further extraction with a water-miscible solvent. In other words, the first step of the reaction is discontinued by neutralization of excess base through the addition of acid or by removing the caustic by precipitation of the product through the addition to a water-miscible organic solvent.

The reaction following the aforesaid precipitation is completed by drying and heating the precipitate so produced. This heating step in the dry state causes the resulting products to have surprisingly increased viscosity and novel flow properties in aqueous solution. In accordance with our invention, we have found that this increase in viscosity on heating in the dry state takes place in the absence of the excess caustic that in the past has been considered essential to the reaction of the etherifying agent with the hydroxyl groups.

In our new method, the reaction in solution is stopped before the viscosity reaches too high a level for satisfactory mechanical manipulation, but the viscosity of the product is increased during heating in the dry state. Thus, the aforesaid difficulties are overcome. Since a substantial viscosity increase during the first reaction step in solution is not desired, this first step is carried out for only a relatively short time at mild temperatures in the presence of a low concentration of caustic. The second step involving heating the product is carried out after the excess caustic has been neutralized or removed. As a result the degradation previously encountered in the treatment of polysaccharides by etherifying agents in the presence of caustic is largely avoided. This results in a great saving in reagents and in high viscosity products with unique flow properties.

We believe that the beneficial results which we have discovered may be due to partial reaction of the epichlorohydrin, for example, with the polysaccharide material in the presence of a base followed by the completion of the process in the substantial absence of a base during the secondary heating step.

We believe that in the aqueous solution, epichlorohydrin, for example, first attaches itself to the gum arabic, dextran or corn fiber gum as shown in chemical Equation 1 below, where the symbol "G" represents the gum arabic molecule, dextran or corn fiber gum less a hydroxyl group. The intermediate molecule thus produced reacts with sodium hydroxide, for example, as shown in Equation 2 without any substantial increase in viscosity. This new intermediate molecule then reacts with a second molecule of gum arabic, dextran or corn fiber gum to produce a larger molecule. The residue from the epichlorohydrin links two of the original molecules, as shown in Equation 3. These reactions are repeated until exceptionally large cross-linked polymers are obtained. We have found that the reaction in Equation 3 is probably not as rapid as that in Equations 1 and 2. Therefore, the latter reaction can be isolated and allowed to continue during heating in the dry state with substantial absence of the base.

EQUATION 1

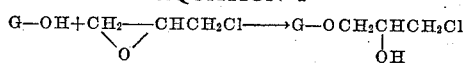

EQUATION 2

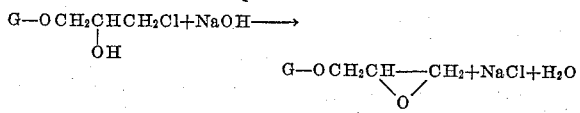

EQUATION 3

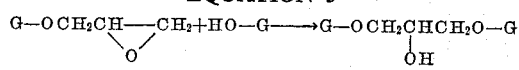

In our experiments, we have found that the delayed viscosity increase is not obtained when the bi-functional etherifying agent is omitted. We have also found that the viscosity does not increase when the untreated gum arabic, dextran or corn fiber gum is heated at the moderately elevated temperatures, for example, 45° to 90° C., which produce the dramatic viscosity increases with our treated products. Gum arabic does increase in viscosity when heated at 135° C., but this is a completely different reaction which does not produce a useful product.

In order to produce a product that will give a high viscosity in aqueous solution and still have good stability it has been found desirable that a number of conditions be met. The cross-linking agent should be selected from the group consisting of epihalohydrins, substituted epihalohydrins or a glycerol dihalohydrin which is capable of producing an epihalohydrin under the reaction conditions. The preferred cross-linking agent is epichlorohydrin. The cross-linking agent should be held within the range of 1 to 15% by weight of the dry weight of the water-soluble polysaccharide, and it is preferably used at the 2% level. The sodium hydroxide on the dry basis should be held within the range of 1 to 20% of the dry weight of the water soluble polysaccharide, and it is preferably used at the 2% level. Other strong bases such as potassium hydroxide may be substituted for the sodium hydroxide. The concentrations of the gum arabic, corn fiber gum or dextran in solutions in the first stage of the reaction should be held within the limits of 8 to 35% of the total solution weight. Their preferred range is 12 to 25%. The reaction temperature during the first stage reaction in solution in the presence of excess caustic should be held within the temperature limits of 10 to 60° C. The preferred temperature of the first stage is 30° C. The reaction time for the first stage at the preferred temperature of 30° C. should be held within the range of ½ to 5 hours. The preferred reaction time at 30° C. is 2½ hours. As the temperature of the first stage reaction is increased, the time of reaction is decreased. Sufficient solvent is required in the precipitation of the product at the end of the first stage solution reaction to give a fluffy precipitate. Failure to obtain a fluffy precipitate results in poor solubility and poor stability. A suitable range for the ratio of solvent weight to reaction mixture weight is from 3 to 1 to 8 to 1. The preferred ratio is 5 to 1. Methanol is the preferred solvent but ethanol, isopropanol or acetone may be used. The second stage reaction in the dry state may be carried out from 25° C., to 90° C. It is preferably carried out at 60° to 80° C. for a period of one to ten days.

*Example 1*

To a solution of 230 gm. of gum arabic of 13.0% volatiles in 570 ml. of water, there were added 4 gm. of sodium hydroxide, the latter being 2% of the weight of the gum arabic solids. While stirring, the temperature of this mixture was adjusted to 30° C. and 4 gm. of epichlorohydrin were added, the latter also being 2% of the weight of the gum arabic solids. The mixture was stirred and heated at 30° C. for two and a half hours. The viscosity increase at the end of this time was small. Then, an amount of 6 N hydrochloric acid sufficient to neutralize the solution was added. The solution was then filtered and the filtrate was slowly poured into 5 l. of stirred methanol. The precipitation product, then formed, was slurried with 800 ml. of fresh methanol and rinsed twice with 400 ml. portions of methanol. After thorough pressing to remove the methanol, the product was dried and heated for two days at 80° C. to complete the second step of the two stage reaction.

A 2% aqueous dispersion of this product had a Brookfield viscosity of 1840 cps. and a "dead" type of flow such as is given by gum tragacanth. The viscosity of the starting gum arabic at a 2% concentration in water was too low to measure conveniently. At a 5% concentration in water the starting gum arabic had a viscosity of 6 cps.

*Example 2*

A solution of 24 g. of dextran in 176 ml. of water was prepared. To this solution there was added 0.48 g. of sodium hydroxide. The temperature of the solution was adjusted to 30° C. While stirring, 0.48 g. of epichlorohydrin was added. The mixture was stirred and heated at 30° C. for two and one half hours. 0.6 ml. of 6 N hydrochloric acid was added to neutralize the solution to a pH of 7. The neutralized solution was slowly poured into 1.4 l. of stirred methanol. The precipitate was washed twice with fresh methanol. After thorough pressing to remove excess methanol, the product was dried and then heated for two days at 60° C. to complete the second step of the two stage reaction.

A 2% aqueous dispersion of this product had a Brookfield viscosity of 1800 cps. Flow properties were moderately "short." Initially a 5% solution tested 1000 cps.

*Example 3*

A solution of 54.4 g. of corn fiber gum, containing 50.0 g. of dry gum, in 246 ml. of water was prepared. One g. of sodium hydroxide was then added. The temperature was adjusted to 30° C., and one g. of epichlorohydrin was added with stirring. Stirring and heating was continued for two and a half hours while the temperature was maintained at 30° C. At the end of two and a half hours no pronounced thickening of the mixture had taken place. The mixture was neutralized with 2.0 ml. of 6 N hydrochloric acid. After dilution with 200 ml. of water the mixture was slowly poured into 3 l. of stirred methanol. The precipitate was rinsed twice with fresh methanol and pressed as dry as possible. After drying the product was heated for two days at 60° C. to complete the second step of the two stage reaction.

A 2% aqueous dispersion of this product had a viscosity as determined by a Brookfield Viscosimeter of 290 cps. while a 5% solution in water had a viscosity of 7,400 cps. The starting material had a viscosity of 79 cps. at a 5% concentration in water. The new product had a long, mucilaginous-type of flow somewhat like that of quinceseed mucilage.

It is understood that the examples are given by way of illustration only, and are not to be considered to limit the scope of the invention as defined in the appended claims.

We claim:

1. A method of preparing a water soluble product suitable for increasing the viscosity of an aqueous solution comprising: admixing at least one of the members selected from the group consisting of gum arabic, dextran and corn fiber gum with a base selected from the group consisting of sodium hydroxide and potassium hydroxide in an amount from 1% to 20% by weight of said members; and a bi-functional etherifying agent in an amount of from 1% to 15% of the aforesaid members selected from the group consisting of epihalohydrins, alkyl substituted epihalohydrins and glycerol dihalohydrins; heating said mixture at a low temperature until the cation of the base forms a salt; adding an acid to neutralize the solution; adding the solution to a water-miscible organic solvent to form a gum precipitate; removing said solvent; and drying and heating said precipitate.

2. A method of preparing a water-soluble product suitable for increasing the viscosity of an aqueous solution comprising: admixing at least one of the members selected from the group consisting of gum arabic, dextran and corn fiber gum with one of the group consisting of sodium hydroxide and potassium hydroxide in an amount from 1% to 20% by weight of said members; and epichlorohydrin in an amount from 1% to 15% by weight of the aforesaid members; stirring and heating said mixture at approximately 30° C. for approximately 2½ hours; pouring the said solution into a water-miscible organic solvent; removing said solvent from said precipitate; and heating and drying said precipitate.

3. A method of preparing a water-soluble high viscosity gum arabic comprising admixing gum arabic; a base selected from the group consisting of sodium hydroxide and potassium hydroxide in an amount from 1% to 20% by weight of said gum; and a bifunctional etherifying agent selected from the group consisting of epihalohydrins, alkyl substituted epihalohydrins and glycerol dihalohydrins in an amount of from 1% to 15% by weight of said gum; heating said mixture at a low temperature until the cation of the base forms a salt; adding an acid to neutralize the solution; adding the solution to a water-miscible organic solvent to form a gum precipitate; removing said solvent; and drying and heating said precipitate.

4. A water-soluble high viscosity gum product prepared by the method described in claim 1.

5. A method of preparing a water-soluble high viscosity gum arabic comprising admixing gum arabic; a base selected from the group consisting of sodium hydroxide and potassium hydroxide in an amount from 1% to 20% by weight of said gum; and epichlorohydrin in an amount of from 1% to 15% by weight of said gum; stirring and heating said mixture at a relatively low temperature until the chloride salt is formed; adding a sufficient amount of an acid to neutralize the solution; pouring the said solution into a water-miscible organic solvent; washing the resulting precipitate with said solvent; removing said solvent from said precipitate; and heating and drying said precipitate.

6. A method of preparing a water-soluble high viscosity gum arabic comprising admixing gum arabic; one of the group consisting of sodium hydroxide and potassium hydroxide in an amount from 1% to 20% by weight of said gum; and epichlorohydrin in an amount from 1% to 15% by weight of said gum; stirring and heating said mixture at approximately 30° C. for approximately 2½ hours; adding an amount of an acid, sufficient to neutralize the solution, from the group consisting of hydrochloric acid, sulfuric acid and acetic acid; filtering the solution; adding and stirring the filtrate into one of the group of solvents consisting of methanol, ethanol, isopropanol and acetone to precipitate the gum; washing said precipitate with said solvent; draining said solvent from said precipitate; and drying and heating said precipitate at a range of 45° C. to 80° C.

7. A method of preparing a water-soluble high viscosity gum arabic comprising admixing gum arabic in an amount of water sufficient to dissolve said gum; 1.5 to 3%, based on the weight of the gum arabic solids, of a base selected from the group consisting of sodium hydroxide and potassium hydroxide; and 1.5 to 3% based on the weight of the gum arabic solids, of a bifunctional etherifying agent selected from the group consisting of epihalohydrins, alkyl substituted epihalohydrins and glycerol dihalohydrins; heating and stirring said mixture for approximately two and a half hours at a temperature of approximately 30° C.; adding dilute hydrochloric acid in an amount sufficient to neutralize the solution; filtering the solution; adding and stirring the filtrate into one of the solvents from the group consisting of methanol, ethanol, isopropanol and acetone; said solvent being in an amount sufficient to precipitate said reacted gum arabic in a flocculant state; washing said precipitate with a fresh quantity of said solvent; draining said solvent from said precipitate; and heating the precipitate at a range of 45° C. to 80° C. for one to two days.

8. A method of preparing a water-soluble high viscosity gum arabic comprising admixing gum arabic in a sufficient amount of water to form a solution; 1.5% to 3% of sodium hydroxide, based on the weight of said arabic; and 1.5% to 3% of epichlorohydrin, based on the weight of said gum arabic; stirring and heating said mixture until a sufficient portion of sodium chloride is formed to indicate that the chloride has been substantially displaced from the epichlorohydrin; adding a sufficient amount of about 6 N hydrochloric acid to neutralize the mixture; filtering said mixture; pouring the resulting filtrate into a sufficient amount of stirred alcohol to precipitate the gum; washing said gum precipitate with fresh alcohol; draining said alcohol from said precipitate; and heating and drying said gum at a range of 45° C. to 80° C. for one to two days.

9. A method of preparing a water-soluble high viscosity gum arabic comprising admixing approximately 230 grams of gum arabic, containing about 13% of volatiles, in a sufficient amount of water to form a solution; 2%, based on the weight of the gum solids, of sodium hydroxide; 2%, based on the weight of the gum solids, of epichlorohydrin; stirring and heating said mixture at 30° C. for approximately two and one half hours; adding a sufficient quantity of about 6 N hydrochloric acid to neutralize the solution; filtering said solution; pouring the resulting filtrate into 5 l. of stirred methanol to precipitate the gum; preparing a slurry of 800 ml. of fresh methanol with the said precipitate; rinsing said precipitate twice with 400 ml. of methanol; pressing the excess of said methanol from the precipitate; and heating and drying said precipitate for approximately two days at approximately 80° C.

References Cited in the file of this patent

UNITED STATES PATENTS

| | | |
|---|---|---|
| 2,496,670 | Moe | Feb. 7, 1950 |
| 2,650,917 | Moe | Sept. 1, 1953 |